United States Patent [19]

Stickel

[11] Patent Number: 4,549,294
[45] Date of Patent: Oct. 22, 1985

[54] TIME-OF-ARRIVAL PULSED WAVEFORM MULTIPLEXER

[75] Inventor: Karl D. Stickel, Ridgecrest, Calif.

[73] Assignee: The United States of America as represented by the Secretary of the Navy, Washington, D.C.

[21] Appl. No.: 588,486

[22] Filed: Mar. 12, 1984

[51] Int. Cl.⁴ .............................................. H04J 3/12
[52] U.S. Cl. .................................. 370/111; 370/110.1
[58] Field of Search ................... 370/111, 119, 110.1, 370/112, 114; 179/84 VF; 375/113

[56] References Cited

U.S. PATENT DOCUMENTS

| | | | |
|---|---|---|---|
| 2,381,847 | 8/1945 | Ullrich | 370/114 |
| 2,884,615 | 4/1959 | Gaffinkel | 340/147 |
| 2,974,281 | 3/1961 | Feldman | 370/111 |
| 3,200,201 | 8/1965 | Runyon | 179/15 |
| 3,311,704 | 3/1967 | Filipowsky et al. | 370/111 |
| 3,601,537 | 8/1971 | Gueldpfenning et al. | 375/113 |
| 3,735,048 | 5/1973 | Tomsa et al. | 370/111 |
| 3,870,828 | 3/1975 | Saliga | 179/15 |
| 4,220,816 | 9/1980 | Howells et al. | 370/24 |
| 4,317,235 | 2/1982 | Tsukada | 375/113 |
| 4,330,858 | 5/1982 | Choquet | 370/111 |

Primary Examiner—Douglas W. Olms
Assistant Examiner—Wellington Chin
Attorney, Agent, or Firm—Robert F. Beers; W. Thom Skeer

[57] ABSTRACT

Apparatus for multiplexing selected information contained in first and second pulse waveform signals includes an analog switch through which the first signal passes unchanged except for periods during which the switch is caused to be thrown. The first signal has periods of activity and inactivity. Voltage detectors detect pulses in the second pulse waveform well as periods of activity and inactivity in the first waveform. A logic network is responsive to the voltage detectors and produces a signal triggering a multivibrator to throw the analog switch during a period of inactivity in the first waveform to indicate the occurrence of a pulse in the second pulse waveform.

4 Claims, 2 Drawing Figures

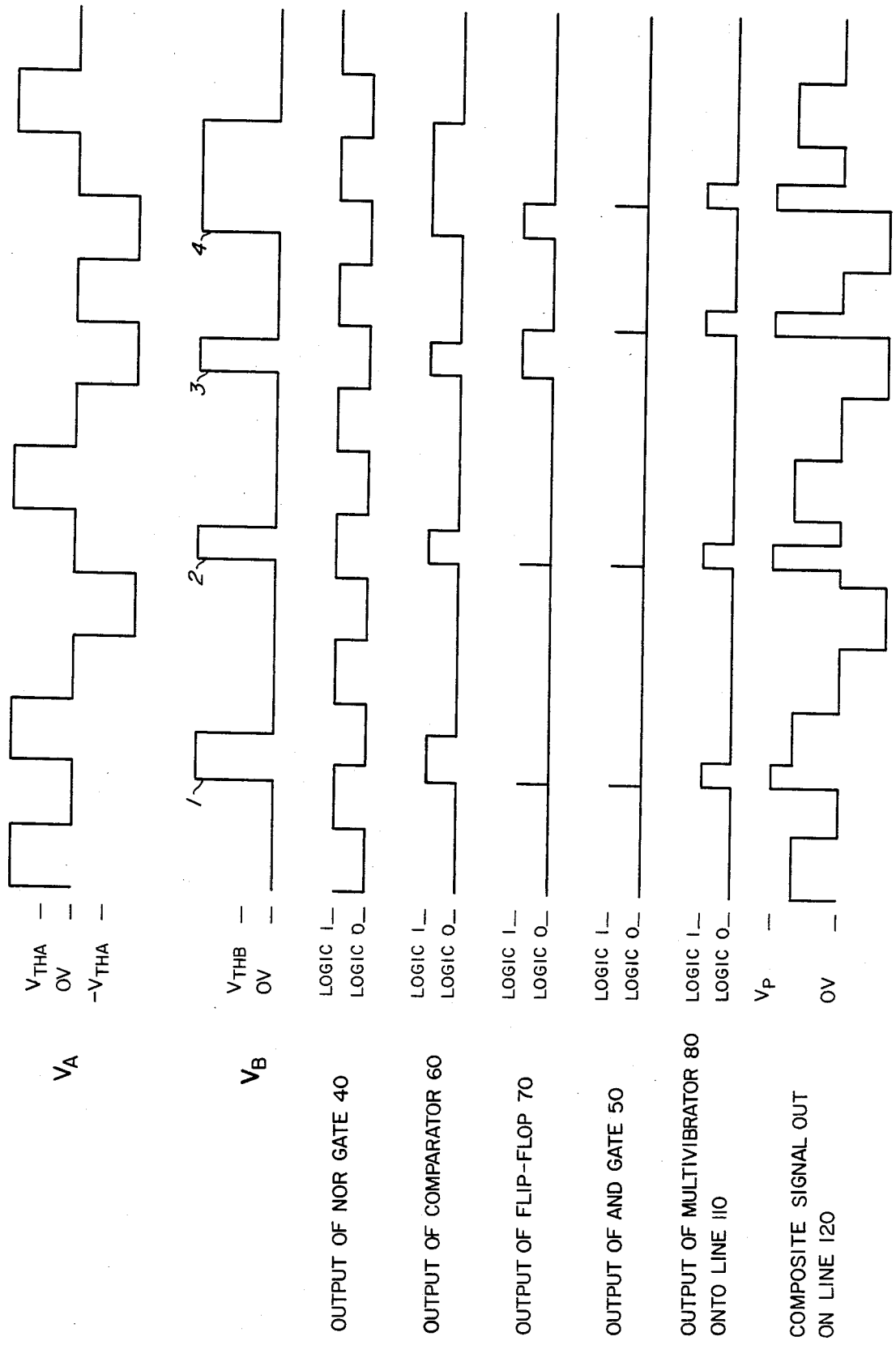

TIME-OF-ARRIVAL PULSED WAVEFORM MULTIPLEXER

BACKGROUND OF THE INVENTION

1. Field of the Invention

This invention relates to the transmission, over a single data limit, of selected information originated and carried initially as separate pulse waveforms on discrete data lines.

2. Description of the Prior Art

The multiplicity of information sources and the paucity of data lines available over which to transmit data in certain applications demands that each available data transmission line be utilized to the fullest extent possible. One such application is the integration of add-on electronics pods to modern aircraft for a variety of purposes. In many cases information is transmitted as a pulse waveform wherein the critical information resides in the amplitude and timing relationships of pulses within the waveform. In these instances the pulse waveform must be transmitted intact or in a manner in which the original amplitude and timing relationship among waveform pulses can be maintained and extracted. In other cases the information to be transmitted resides in the fact that a pulse occurs in the waveform with amplitude and timing relationships among pulses being inconsequential. While innumerable multiplexing schemes exist, most are complex and require a significant amount of hardware. A need was determined to exist to provide simple and inexpensive apparatus with which to multiplex preselected critical information, carried initially as pulse waveform on discrete data lines, over a single data line.

SUMMARY OF THE INVENTION

Prior to their input to the apparatus of the present invention pulse waveforms originate and are carried on two discrete data transmission lines. The integrity of amplitude and timing relationships between individual pulses in a first pulse waveform is critical and to be preserved while the amplitude and timing relationship of pulses in the second waveform is inconsequential. The information carried by the second pulse waveform resides in the occurrence of a pulse in the waveform and not in the amplitude, timing or duration of the pulse.

The first pulse waveform is continuously input to and transmitted through an analog switch within the apparatus of the present invention with the exception of short periods of predetermined duration during which the analog switch is caused to be thrown indicating the occurrence of a pulse in the second waveform. The first pulse waveform is a two-state waveform, the waveform being active in one state and inactive in the second state. In the active state pulses within the first pulse waveform exceed positive or negative threshold voltages of predetermined value. In addition to being input to the aforementioned analog switch, the first pulse waveform is input to a detector subcircuit which determines whether the first pulse waveform is in the active or inactive state at any point in time. While the first pulse waveform is in an active state the detector subcircuit produces a signal inhibiting the analog switch from being thrown and allowing the first pulse waveform to be transmitted in an uninterrupted fashion.

The second pulse waveform is input to a voltage comparator within the apparatus which detects and signals the presence of each pulse as it occurs in the second waveform. The signal produced by the voltage comparator is input to a flip-flop which enables a logic gate to trigger a monostable multivibrator during a period of inactivity in the first pulse waveform. The multivibrator, when triggered, causes the aforementioned analog switch to be thrown for a predetermined length of time, interrupting the transmission of the first pulse waveform and indicating the occurrence of a pulse in the second pulse waveform. As a result of the operation of the apparatus of the present invention essential pulse amplitude and timing characteristics of a first pulse waveform are transmitted intact across a single data line over which indication of the occurrence of pulses in a second pulse waveform are also transmitted.

An object of the invention therefore is to transmit selected information carried initially on two discrete data lines over a single data line.

A further object of this invention is to transmit selected information received in the form of pulse waveforms on two input data lines over a single data line in a manner such that information represented by the amplitude and timing relationships among individual pulses in one of the two waveforms is maintained intact across the single output data line.

The features briefly noted above as well as other features and objects of the invention will become apparent by reference to the following description when interpreted in conjunction with the accompanying drawing.

DESCRIPTION OF THE DRAWING

FIG. 2 is a timing diagram illustrating typical input pulse waveforms and the signals produced by apparatus components in response to receipt of pulses within the input waveforms.

DESCRIPTION OF THE PREFERRED EMBODIMENT

Figure 1:
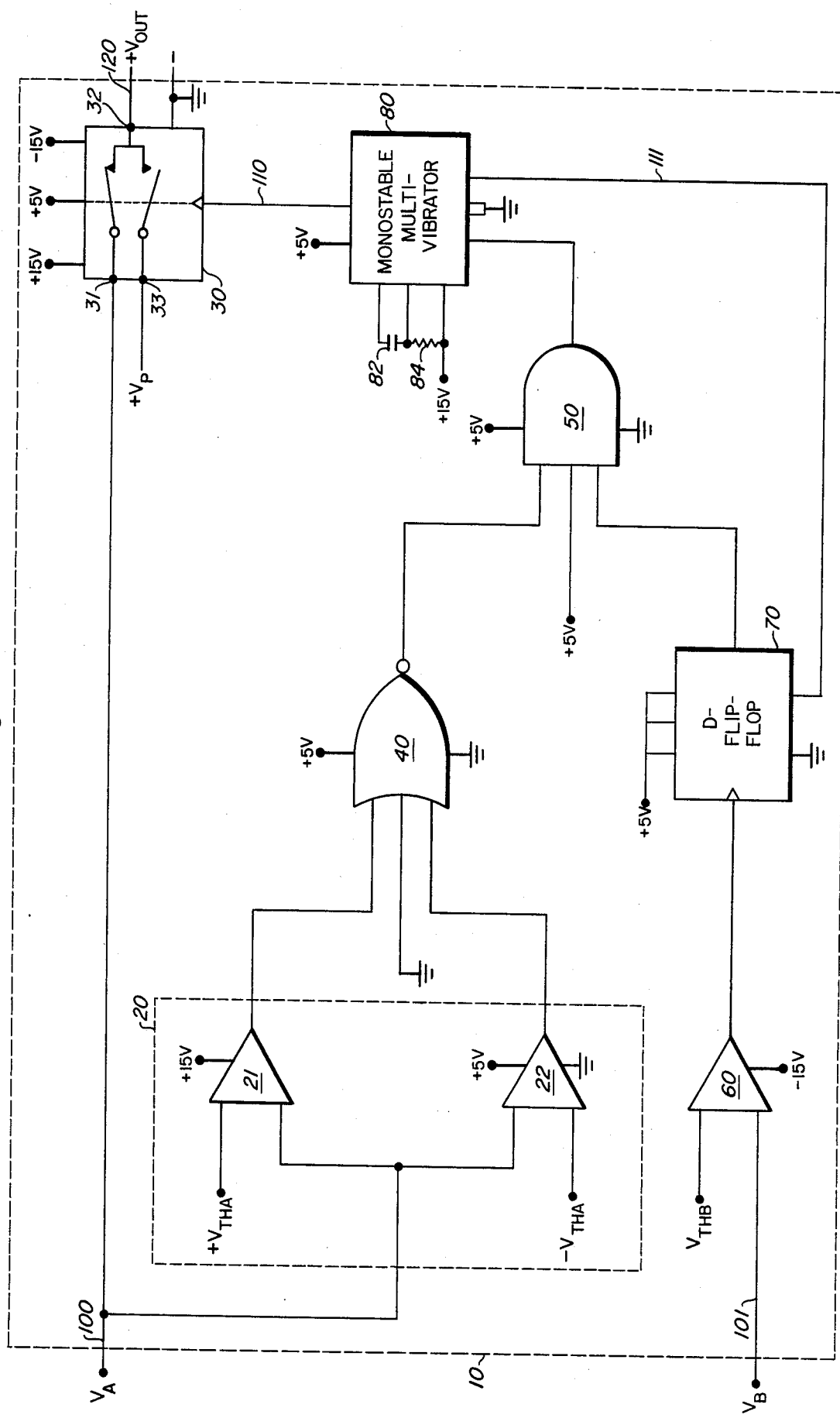
FIG. 1 is a schematic diagram illustrating apparatus for transmitting selected information originated on two data lines over a single data line.

Referring to FIGS. 1 and 2 concurrently it is seen that input line 100 carries a first pulse waveform $V_A$. The $V_A$ waveform consists of a series of positive and negative square wave pulses and is divisible into two states. In its active state the $V_A$ waveform exceeds positive or negative threshold voltages of a predetermined level. In its inactive state the waveform voltage is less than the predetermined threshold voltages. The $V_A$ pulse waveform is input to window detector 20 as well as analog switch 30 within multiplexing apparatus 10. Analog switch 30, until thrown, transmits the $V_A$ signal input on line 100 directly out of apparatus 10 on output data line 120. In the normal course of operation, then, input terminal 31 of analog switch 30 is connected to output terminal 32.

The $V_A$ signal is input to level detectors 21 and 22 within window detector 20 of apparatus 10. Level detector 21 has, as a second input, a positive threshold voltage $V_{THA}$ of a predetermined value. Whenever a pulse occurs in the $V_A$ signal having an amplitude exceeding $V_{THA}$ level detector 21 outputs a logic ONE signal indicating that the $V_A$ signal is in an active state. At all other times, level detector 21 outputs a logic ZERO. Similarly, level detector 22 has, as a second input, a predetermined negative voltage $-V_{THA}$ which is a negative threshold voltage. Whenever a pulse occurs in the $V_A$ signal having a negative amplitude exceeding the $-V_{THA}$ value level detector 22 outputs a logic ONE signal. At all other times, level detector 22 outputs a logic ZERO.

The outputs of level detectors 21 and 22 are input to NOR gate 40 which will produce a logic ONE signal only when the signals received from both level detectors 21 and 22 are logic ZERO signals. Whenever either of level detectors 21 or 22 is producing a logic ONE NOR gate 40 will produce a logic ZERO. Thus, during periods of inactivity in the $V_A$ signal NOR gate 40 produces a logic ONE signal while a logic ZERO is produced by NOR gate 40 whenever the $V_A$ signal is in its active state.

Apparatus 10 receives a second pulse waveform $V_B$ as an input on line 101. The $V_B$ waveform consists of a series of square wave pulses each of which exceeds a predetermined threshold voltage $T_{THB}$. The occurrence of a pulse in the $V_B$ waveform is to be communicated across output data line 120 although amplitude, duration and timing relationships among individual $V_B$ pulses is unimportant and need not be maintained.

The $V_B$ signal is input to voltage comparator 60 of apparatus 10, as is threshold voltage $V_{THB}$. When a pulse exceeding threshold voltage $V_{THB}$ occurs in the $V_B$ waveform voltage comparator 60 produces a logic ONE signal. Logic ONE signals produced by voltage comparator 60 are input to leading edge-triggered D-type flip-flop 70 causing flip-flop 70, to produce a logic ONE control signal in response.

The outputs of NOR gate 40 and flip-flop 70 are input to AND gate 50 which produces a logic ONE trigger signal whenever all inputs to it are logic ONE signals. Thus, when NOR gate 40 produces a logic ONE, indicating that the $V_A$ waveform is in an inactive state, and flip-flop 70 is triggered to produce a logic ONE signal by the occurrence of pulse in the $V_B$ waveform AND gate 50 produces a logic ONE signal. Logic ONE signals produced by AND gate 50 are initiated only during periods of inactivity in the $V_A$ waveform.

Production of a logic ONE by AND gate 50 triggers monostable multivibrator 80 to produce single output switching pulses of predetermined duration on lines 110 and 111 within apparatus 10. The duration of pulses produced by multivibrator 80 and imposed on lines 110 and 111 is determined by the preselected capacitance and resistance values capacitor 82 and resistor 84.

When multivibrator 80 imposes a pulse on line 110 analog switch 30 is caused to be thrown for the duration of the imposed pulse. When switch 30 is thrown input terminal 33 is connected to output terminal 32. Input terminal 33 of switch 30 is connected to a voltage source $V_P$ having a voltage level predetermined to exceed the amplitude of pulses which occur in the $V_A$ signal. While terminals 32 and 33 are connected, the transmission of the $V_A$ waveform through analog switch 30 is interrupted and a pulse having a duration equal to the duration of a pulse imposed on line 110 by multivibrator 80 and a voltage level equal to the $V_P$ voltage input to switch 30 at terminal 33 is imposed on output line 120 of apparatus 10. The pulse imposed on output line 120, as a result of switch 30 being thrown, is imposed only during periods of inactivity in the $V_A$ waveform. In addition to the pulse imposed by multivibrator 80 on line 110 which acts to throw switch 30, multivibrator 80 imposes a pulse on line 111 which is the logic inverse of the pulse imposed on line 110. Pulses output by multivibrator 80 on line 111 are input to and clear flip-flop 70 setting it up to signal the receipt of a subsequent pulse in the $V_B$ waveform.

The operation of apparatus 10 is defined by periods of inactivity within the $V_A$ waveform as well as the time-of-arrival The operation of apparatus 10 is defined by periods of inactivity within the $V_A$ waveform as well as the time-of-arrival of pulses in the $V_B$ waveform. When a pulse in the $V_B$ waveform arrives during a period of inactivity in the $V_A$ waveform, as demonstrated by pulses 1 and 2 in the $V_B$ waveform illustrated in FIG. 2, the output of AND gate 50 immediately transitions from a logic ZERO to a logic ONE and multivibrator 80 is triggered to produce the control pulse which throws analog switch 30 and causes a pulse of predetermined voltage and duration to be imposed on output line 120.

Examining FIG. 2 more closely it is seen that a pulse may occur in the $V_B$ waveform at a point close enough in time such that multivibrator 80 triggers the throwing of analog switch 30 and imposition of an output pulse on output line 120 so as to effectively mask the beginning of a pulse in the $V_A$ waveform as transmitted through analog switch 30. This situation is demonstrated by pulse 1 in the $V_B$ waveform and its effect on the composite signal output from apparatus 10 on output line 120. The amplitude and timing relationships of pulses in the $V_A$ waveform are not destroyed. At least a portion of each pulse in the $V_A$ waveform is transmitted through apparatus 10 intact and in every case the trailing edge of a pulse in the $V_A$ waveform is detectable. That a portion of each pulse in the $V_A$ waveform, including the trailing edge of each pulse, is transmitted out of apparatus 10 presumes that the duration of pulses imposed on output line 120 in response to the occurrence of a pulse in the $V_B$ waveform is controlled such that the imposed pulse cannot completely mask a pulse in the $V_A$ waveform. The duration of pulses imposed on output line 120 by the throwing of analog switch 30 is, as earlier mentioned, controlled by the user of apparatus 10 who may select capacitance and resistance values for capacitor 82 and resistor 84 in order to predetermine the duration of pulses imposed on output line 120. In this manner information carried by waveform $V_A$ and characterized by pulse amplitude and the timing relationship among pulses in the $V_A$ waveform is transmitted and may be extracted intact from the signal produced by and output from apparatus 10 on output line 120.

Pulse 2 in the $V_B$ waveform, illustrated in FIG. 2, is also received by apparatus 10 during a period of inactivity in the $V_A$ waveform. In the case of pulse 2, multivibrator 80 is triggered and causes a pulse to be produced which is initiated and completed during a single inactive period in the $V_A$ waveform. No active pulse in the $V_A$ waveform is affected by the receipt of pulse 2 of the $V_B$ waveform in apparatus 10.

Pulses 3 and 4 in the $V_B$ waveform are pulses the leading edge of which are received by apparatus 10 during a period of activity in the $V_A$ waveform. As such, the output of NOR gate 40 is a logic ZERO when pulses 3 and 4 are received and although flip-flop 70 is caused to produce a logic ONE upon receipt of pulses 3 and 4, AND gate 50 is disabled from producing a logic ONE to trigger multivibrator 80 until the beginning of a period of inactivity in the $V_A$ waveform. The receipt of pulses 3 and 4 of the $V_B$ waveform in apparatus 10 is not signalled on output line 120 until some point in time subsequent to their receipt in apparatus 10. As noted earlier, the critical information in the $V_B$ waveform which is to be preserved across output line 120 is the fact of occurrence of pulses within the $V_B$ waveform, their timing, amplitude and duration being irrelevant.

Apparatus 10 is inexpensive and simple and is useful under a variety of premises. One premise under which apparatus 10 may be utilized is that if indication of occurrence of each pulse occurring in the $V_B$ waveform is to be transmitted by apparatus 10, the $V_A$ and $V_B$ waveforms must bear a relationship such that no more than one pulse can occur in the $V_B$ waveform during the course of an active period in the $V_A$ signal. If, however, the occurrence of a second pulse in the $V_B$ waveform during a discrete period of activity in the $V_A$ waveform is inconsequential and indication of occurrence of pulses in the $V_B$ waveform subsequent to an initial $V_B$ pulse received during the course of any active period in the $V_A$ waveform need not be signaled across outlet line 120, apparatus 10 will accommodate any $V_A$ and $V_B$ waveforms.

While the apparatus described above constitutes the preferred embodiment of this invention, it is to be understood that the invention is not limited to this precise form and that changes may be made to the apparatus without departing from the scope of the invention.

What is claimed is:

1. Apparatus for multiplexing selected information contained in first and second pulse waveform signals transmitted on first and second input lines over a single output data line where said first signal includes periods of activity and inactivity, said active periods being periods during which the voltage of said first signal exceeds a predetermined voltage, comprising:

a first detector connected to said input line for detecting a pulse in said second signal;

switch means for selective transmission of said first signal or a constant voltage signal of a value in excess of the maximum voltage level of said first signal in response to a switching signal applied thereto;

a second detector for detecting said periods of activity and inactivity in said first signal connected to said first input line;

a first logic gate connect to said second detector for producing an enabling signal when said first line is inputting a period of inactivity;

a flip-flop connected to said first detector for producing a control-signal indicative of the detection of a pulse in said second signal said control signal continuing until cleared by a clearing pulse;

a second logic gate connected to said first logic gate to receive the enabling signal output thereof and to said flip-flop to receive the control signal output thereof for producing a trigger signal output in response to concurrent receipt of the enabling signal and the control signal; and a monostable multivibrator connected to said second logic gate for receipt of said trigger signal therefrom and connected to said flip-flop for outputting a signal thereto and connected to said switch means for supplying a switching signal thereto.

2. The apparatus according to claim 1 wherein said voltage has positive and negative values and said second detector comprises:

a first level detector connected to said first input line and having said first signal and a voltage equal to said positive threshold voltage as inputs, said first level detector producing a signal indicative of periods during which the voltage of said first signal exceeds said positive threshold voltage; and a second level detector, connected to said first input line and having said first signal and a voltage equal to said negative threshold voltage as inputs, said second level detector producing a signal indicative of periods during which the voltage of said first signal is a negative threshold voltage in magnitude.

3. The apparatus according to claim 1 wherein said first detector is a voltage comparator having said second signal and a third threshold voltage as inputs, said voltage comparator producing a signal indicative of the receipt of a pulse in said second signal whenever the voltage of said second signal exceeds said third threshold voltage.

4. The apparatus according to claim 1 wherein said first logic gate is a NOR gate, said second logic gate is an AND gate and said flip-flop is a D-type flip-flop.

* * * * *